US012168940B1

(12) United States Patent
Stocco

(10) Patent No.: US 12,168,940 B1
(45) Date of Patent: Dec. 17, 2024

(54) RADIAL TRANSITION FIT BETWEEN PRIMARY AND SECONDARY PARTS OF A ROTOR ASSEMBLY

(71) Applicant: PRATT & WHITNEY CANADA CORP., Longueuil (CA)

(72) Inventor: Thierry Stocco, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/463,676

(22) Filed: Sep. 8, 2023

(51) Int. Cl.
*F01D 7/02* (2006.01)

(52) U.S. Cl.
CPC ............ *F01D 7/02* (2013.01); *F05D 2220/32* (2013.01)

(58) Field of Classification Search
CPC ............................... F01D 7/02; F05D 2220/32
See application file for complete search history.

(56) References Cited

U.S. PATENT DOCUMENTS 3,572,966 A * 3/1971 Borden ................... F01D 5/081 415/177
4,854,821 A 8/1989 Kernon et al.
5,330,324 A * 7/1994 Agram .................. F01D 11/006 416/221
7,264,447 B2 * 9/2007 Ono ...................... F01D 5/3015 416/193 A
8,128,374 B2 * 3/2012 Boeck ................... F01D 5/3015 29/889.21
9,803,485 B2 10/2017 Snyder
10,184,345 B2 1/2019 Himes
10,508,557 B2 * 12/2019 Jung ..................... F01D 5/3015
10,539,029 B2 1/2020 Oren et al.
10,677,072 B2 6/2020 Ju
10,801,361 B2 10/2020 Prabhakar et al.
11,111,799 B2 9/2021 Murata et al.
11,313,240 B2 4/2022 Krupski et al.
2013/0202433 A1 * 8/2013 Hafner .................. F01D 11/008 415/230
2018/0298766 A1 * 10/2018 Jung ....................... F01D 5/326

* cited by examiner

*Primary Examiner* — David E Sosnowski
*Assistant Examiner* — Theodore C Ribadeneyra
(74) *Attorney, Agent, or Firm* — NORTON ROSE FULBRIGHT CANADA LLP

(57) ABSTRACT

A turbomachine comprises a primary rotor part and a secondary rotor part mounted to the primary rotor part for joint rotation therewith. The primary part and secondary parts have a tight fit between a radially inner diameter surface of the secondary part and a radially outer diameter surface of the primary part. The primary part has a radial stop operable to limit centrifugal growth of the secondary part when a maximum operating speed of the primary rotor is exceeded. The radial stop includes a radially inner surface facing an associated radially outer surface of the secondary part. When an operating speed of the primary part is inferior to the maximum operating speed, the radial stop of the primary part and the associated radially outer surface of the secondary part are spaced by a radial gap sized to close when the maximum operating speed is exceeded.

19 Claims, 3 Drawing Sheets

RADIAL TRANSITION FIT BETWEEN PRIMARY AND SECONDARY PARTS OF A ROTOR ASSEMBLY

TECHNICAL FIELD

The application relates generally to a rotor assembly for use in a turbomachine, such as a gas turbine engine.

BACKGROUND OF THE ART

Turbomachines, such as gas turbine engines, comprise multiple rotor assemblies including primary rotor parts and secondary rotor parts mounted to the primary rotor parts. During engine operation, the primary and secondary parts are subject to high loads. Centrifugal loads transferred from the secondary parts to the primary parts may affect the durability of the primary parts. However, in some instances, the secondary parts lack sufficient strength to withstand overspeed conditions and, thus, they need the support provided by the primary part to comply with overspeed certification requirements.

Improvements are thus desirable.

SUMMARY

In one aspect, there is provided a rotor assembly for a gas turbine engine, the rotor assembly comprising: a disc mounted for rotation about an axis, the disc having a hub, a web extending radially outward from the hub, and a blade attachment at a radially outer diameter of the web; a coverplate mounted to a forward or an aft facing side of the disc, the coverplate having a primary disc interface and an auxiliary disc interface, the primary disc interface including a radially inner diameter surface in tight fit engagement with a corresponding radially outer diameter surface of the disc, the auxiliary disc interface including a radially outer surface engageable with a surrounding radially inner abutment surface of the disc; wherein under non-overspeed operating conditions, the radially outer surface of the auxiliary disc interface of the coverplate is spaced by a gap radially inwardly from the surrounding radially inner abutment surface of the disc, and wherein in the event of a rotor overspeed condition, the radially outer surface of the auxiliary disc interface of the coverplate moves outward under the centrifugal force against the surrounding radially inner abutment surface of the disc.

In another aspect, there is provided a rotor assembly for a gas turbine engine, comprising: a disc mounted for rotation about an axis, the disc having a web extending radially outwardly from a hub to a peripheral rim carrying a circumferential array of blades; a coverplate interfaced with the disc via a primary interface, the primary interface comprising a radially inner diameter surface of the coverplate in tight fit engagement with a radially outer diameter surface projecting axially from the hub of the disc; and a centrifugal load path operable for transferring centrifugal loads from the coverplate to the disc, the centrifugal load path having an idle state in which the centrifugal load path is disabled to hinder transfer of centrifugal loads from the coverplate to the disc when a speed of the rotor assembly is inferior to a maximum operating speed, and an active state in which the centrifugal load path is active to transfer centrifugal loads from the coverplate to the disc when the speed of the rotor assembly exceeds the maximum operating speed.

In a further aspect, there is provided a turbomachine comprising: a primary rotor part mounted for rotation about an axis; a secondary rotor part mounted to the primary rotor part for joint rotation therewith about the axis; wherein the primary rotor part and the secondary rotor part have a primary interface comprising a tight fit between a radially inner diameter surface of the secondary rotor part and a radially outer diameter surface of the primary rotor part; wherein the primary rotor part has a radial stop operable to limit centrifugal growth of the secondary rotor part when a maximum operating speed of the primary rotor part is exceeded, the radial stop including a radially inner surface facing an associated radially outer surface of the secondary rotor part; and wherein when an operating speed of the primary rotor part is inferior to the maximum operating speed, the radial stop of the primary rotor part and the associated radially outer surface of the secondary rotor part are spaced by a radial gap, the radial gap being sized to close when the maximum operating speed is exceeded.

DESCRIPTION OF THE DRAWINGS

Reference is now made to the accompanying figures in which.

DETAILED DESCRIPTION

Turbomachines, such as gas turbine engines, can overspeed due to various reasons, including shaft failure, variable geometry, mal-schedule or fuel system malfunction. Overspeed can be generally defined as a condition in which a rotor of the turbomachine reaches a speed over its design limits. Shaft failure events in particular result in a sudden decoupling of the compressor and turbine with no instantaneous change in the power flow. Under these conditions, the turbine is likely to accelerate to high terminal speeds above its design limits. Whichever the cause of the failure, the engine manufacturer needs to demonstrate to the certifying Authority that the event will be handled safely without release of highly energetic material. The certifying Authority must be satisfied that the engine is safe to be operated within declared limits, even in the event of component or shaft failure.

Engine manufacturers are thus to design rotors to have sufficient strength to withstand both normal operation conditions and conditions when maximum permissible operating speed is exceeded (overspeed condition). However, rotor assemblies often have secondary rotor parts that do not have sufficient strength to withstand an overspeed condition. These secondary rotor parts are thus typically mounted to the associated primary rotor part such that the centrifugal load of the secondary rotor part is transferred to the primary rotor part during both normal operation conditions and overspeed conditions. This translates into additional loads and stresses on the primary rotor part. In some situations, this may result in shorter life service and cause durability issues. In other applications, the primary rotor part may be overdesigned to withstand the additional loads of the secondary rotor parts, thereby resulting in extra weights and costs.

As will be seen herein after, the disclosure is generally directed to a rotor assembly comprising a primary rotor part and a secondary rotor part that is mounted to the primary part such that centrifugal loads are transferred from the secondary part to the primary part only in the event of an overspeed condition (i.e., the centrifugal load of the secondary part is not transferred to primary part during normal operating conditions). According to one or more embodiments, this may be done by having a radial fit transferring from being radially above the primary part to radially below the primary part in overspeed condition. Such a transitional radial fit between the primary part and secondary part of the rotor assembly may result in reduced stress on the primary part during normal operating conditions. In this way, the durability of the primary part may be improved while still meeting overspeed design requirements for both the primary and secondary parts of the rotor assembly.

Figure 1:
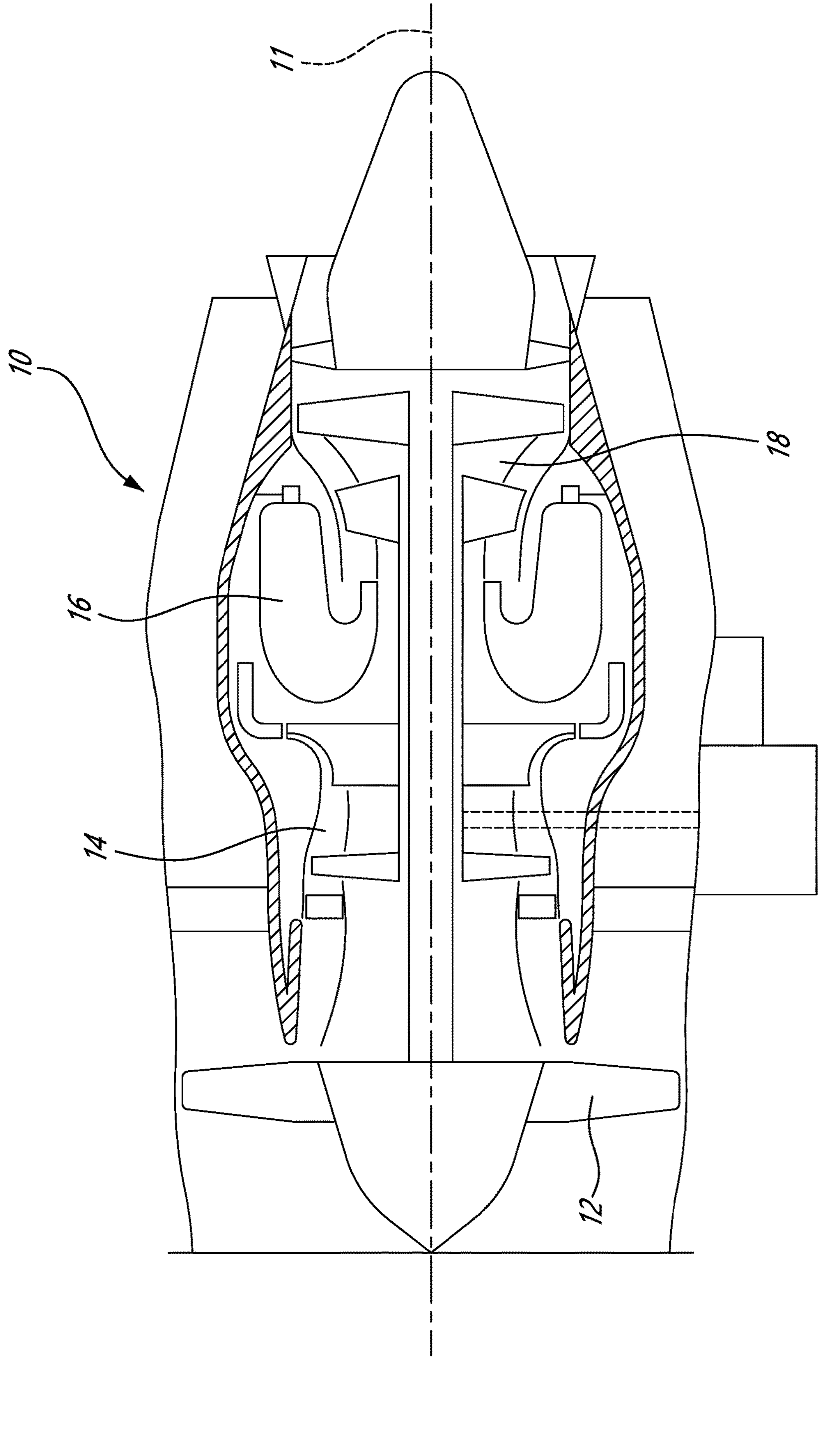
FIG. 1 is a schematic cross section view of a gas turbine engine.

The above described transitional fit assembly may be embodied in a rotor assembly of a gas turbine engine 10 as for instance exemplified in FIG. 1. The exemplified gas turbine engine 10 is of a type preferably provided for use in subsonic flight, and generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
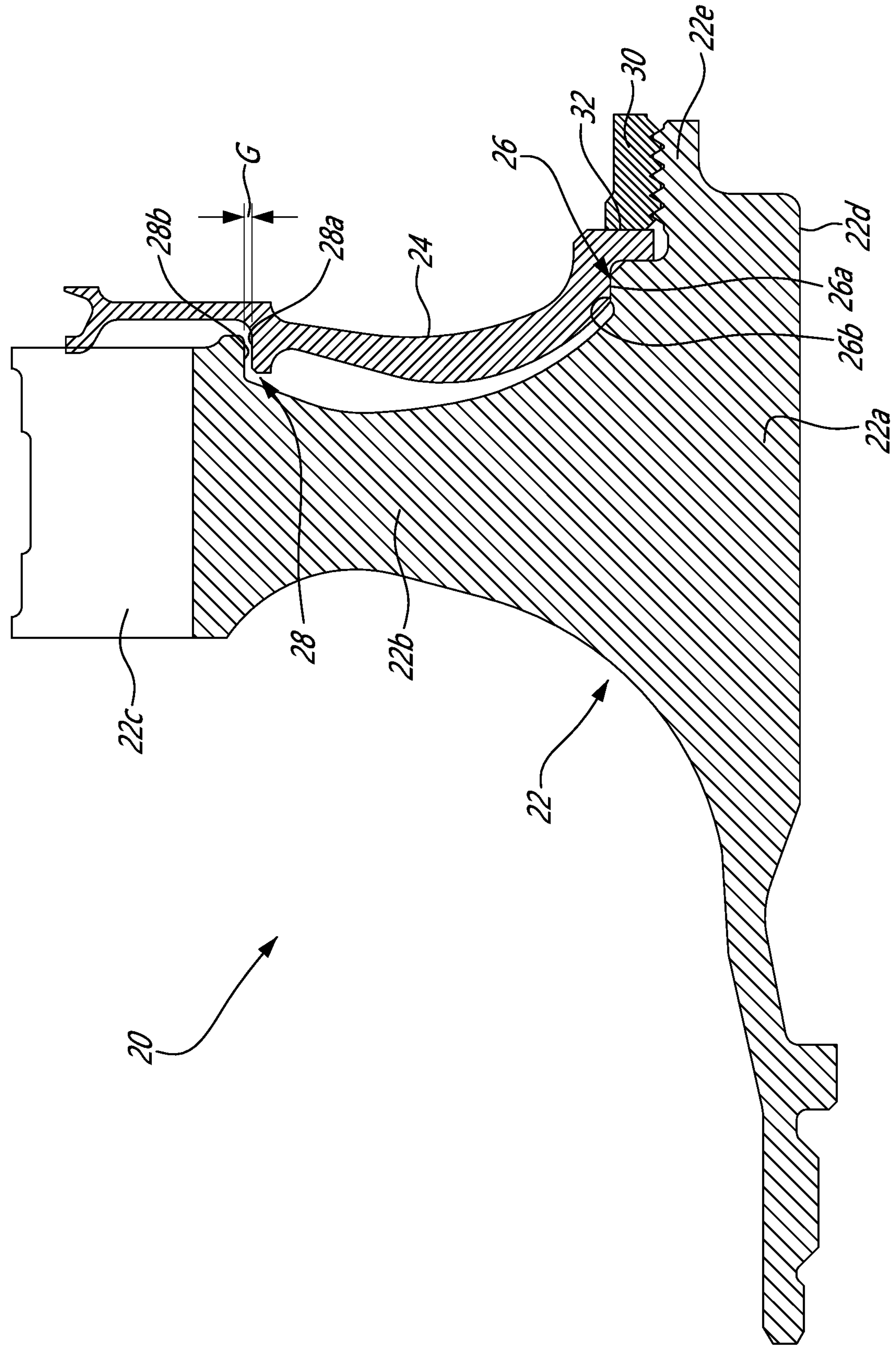
FIG. 2 is a schematic cross-section view of a rotor assembly of the engine shown in FIG. 1, the rotor assembly shown in a normal engine operating condition with a primary radial fit between a rotor disc and a coverplate.

FIG. 2 schematically illustrates an exemplary rotor assembly 20 of the gas turbine engine 10. The rotor assembly 20 may for instance form part of the compressor or turbine section 14, 18 of the engine 10. The rotor assembly 20 generally comprises a primary part, herein exemplified as a turbine disc 22 mounted for rotation about an engine axis 11 (FIG. 1), and one or more secondary parts mounted to the primary part for rotation therewith. As exemplified in FIG. 2, the secondary part may include a coverplate 24 mounted to a forward or an aft facing side of the disc 22. According to the illustrated embodiment, the coverplate 24 is mounted to the aft facing side of the turbine disc 22.

The disc 22 may be provided in the form of a one-piece body comprises a hub **22*a*, a web 22*b* extending radially outwardly from the hub 22*a*, and a peripheral rim in the form of a blade attachment 22*c* at a radially outer diameter of the web 22*b*. The hub 22*a* defines a central bore 22*d* for engagement with a rotor shaft (not shown) mounted for rotation about the rotation axis 11. The blade attachment 22*c*** is configured to carry a circumferential array of blades as known in the art.

The coverplate 24 may be configured to perform various roles. For instance, the coverplate 24 may act as a heat shield to thermally shield the disc 22 from the hot combustion gases flowing through the core gaspath of the engine 10. The coverplate 24 can also be used to direct cooling air to the root of the blades to provide blade internal cooling. The coverplate 24 may also be used as an axial stopper to axially retain the blades in position on the disc 22. It is understood that the coverplate 24 may perform one or more of these functions. The coverplate 24 may be provided in the form of a one-piece annular body.

The disc 22 and the coverplate 24 have a primary interface 26. The primary interface 26 may include a tight fit engagement between a radially inner diameter surface **26*a* of the coverplate 24 and a radially outer diameter surface 26*b* of the disc 22. The radially outer diameter surface 26*b* may project axially from a side of the hub 22*a* of the disc 22 (the aft side according to the illustrated embodiment). The tight fit engagement at the primary interface 26 ensures that the coverplate 24 is concentrically mounted to the disc 22. Thermal treatment or other known techniques may be used to facilitate the assembly of the coverplate 24 on the disc 22. For instance, the coverplate 24 may be pre-heated and then allowed to shrink/contract onto the radially outer surface 26*b* of the disc 22. By so mounting the coverplate 24 on a radially outer diameter surface 26*b* of the disc 22, the centrifugal load of the coverplate 24 are not transferred to the disc 22 during normal engine operation. This allows reducing the loads on the disc 22** during normal engine operation.

Figure 3:
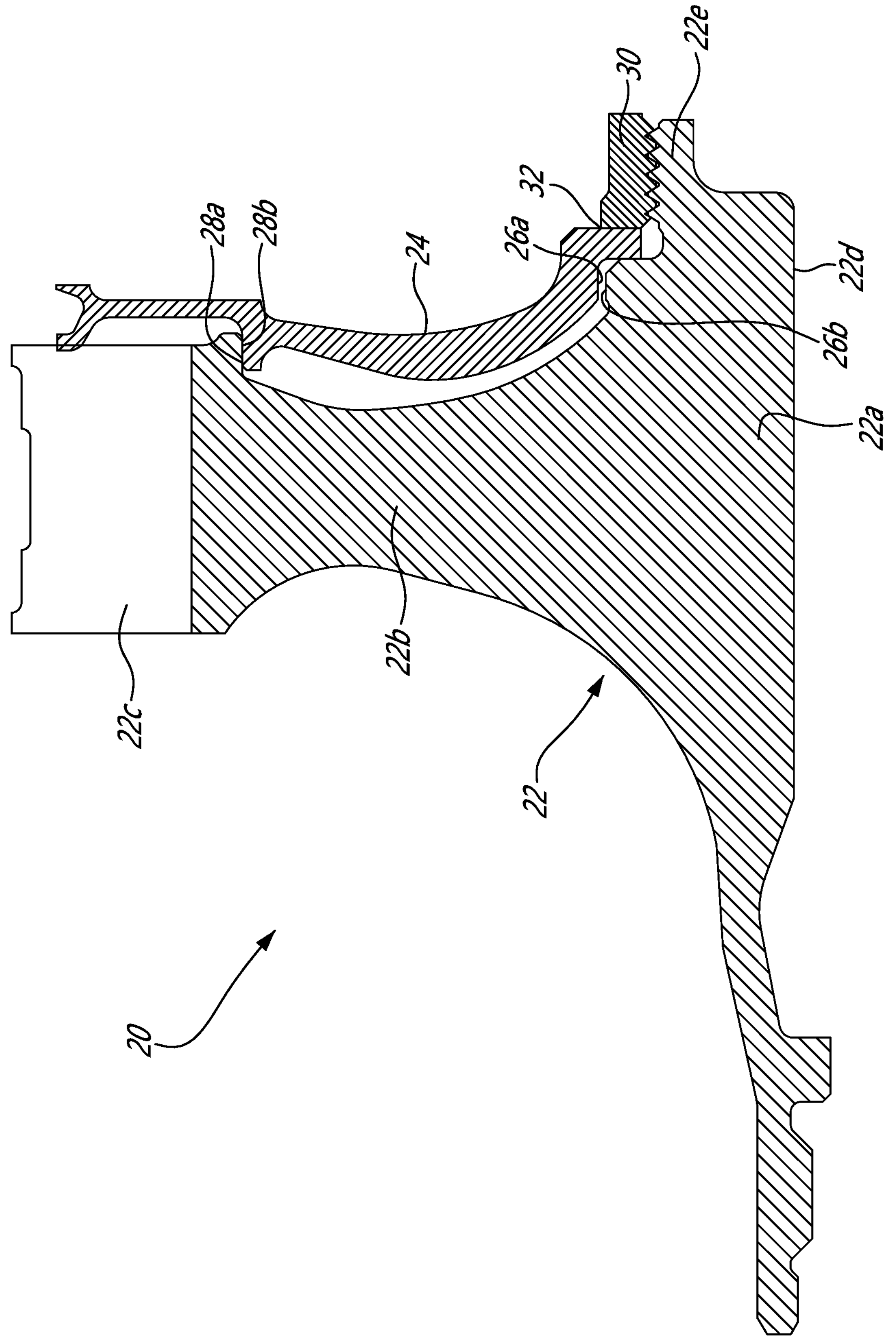
FIG. 3 is a schematic view of the rotor assembly shown in a rotor overspeed condition and illustrating a transition from the primary radial fit to an auxiliary radial fit between the disc and the coverplate.

However, in some applications, the coverplate 24 may not be strong enough to withstand by itself an overspeed condition (e.g., a speed corresponding to 120% of a maximum operation speed as for instance prescribed by some certification Authorities). To satisfy overspeed certification requirements, the coverplate 24 may be provided with an auxiliary disc interface 28 configured to provide additional support to the coverplate 24 in the unlikely event of a rotor overspeed. The auxiliary disc interface 28 may comprise a radially outer diameter surface **28*a* of the coverplate 24 for engagement with a surrounding radially inner diameter surface 28*b* of the disc 22. The radially inner diameter surface 28*b* may form part of an annular shoulder projecting axially from a radially outer end of the web 22*b* of the disc 22. As shown in FIG. 2, in normal operating condition (i.e., in a non-overspeed condition), the radially outer diameter surface 28*a* and the radially inner diameter surface 28*b* are spaced by a gap "G". In this way, the centrifugal loads of the coverplate 24 are not transferred to the disc 22 in normal engine operating condition. However, as shown in FIG. 3, in the event of an overspeed condition, the coverplate 24 will expand radially outwardly under the centrifugal force, thereby closing the gap "G". As a result of the centrifugal growth of the coverplate 24, the radially outer diameter surface 28*a* of the coverplate 24 moves against the surrounding radially inner diameter surface 28*b* of the disc 22, thereby allowing centrifugal loads to be transferred from the coverplate 24 to the disc 22. The radially inner diameter surface 28*b* of the disc 22 thus acts as a radial stop to limit the centrifugal expansion of the coverplate 24. The gap "G" is sized to close when the rotational speed of the rotor assembly exceeds its maximum design limit. The gap "G" is thus sized as a function of the centrifugal growth of the coverplate 24 in an overspeed condition (that is at a rotational speed at which the coverplate 24** is subject to plastic deformation under the effect of the centrifugal force).

It can be appreciated that the auxiliary interface 28 between the disc 22 and the coverplate 24 provides a centrifugal load path having an idle state in which the centrifugal load path is disabled to hinder transfer of centrifugal loads from the coverplate 24 to the disc 22 when a speed of the rotor assembly 20 is inferior to a maximum operating speed, and an active state in which the centrifugal load path is active to transfer centrifugal loads from the coverplate 24 to the disc 22 when the speed of the rotor assembly 20 exceeds the maximum operating speed.

As can be appreciated in FIG. 3, the coverplate 24 may be configured such that in the event of an overspeed condition, the fit at the primary interface 26 becomes loose. That is the fit between the coverplate 24 and the disc 22 is transferred from the primary interface 26 to the auxiliary interface 28. In such a scenario, in the event of an overspeed condition, the support between the coverplate 24 and the disc 22 is ensured by the engagement of the radially outer diameter surface 28*a* of the coverplate 24 with the radially inner diameter surface 28*b* of the disc 22. According to other embodiments, the coverplate 24 could be configured to preserve the tight fit between the radially inner diameter surface 26*a* of the coverplate 24 and the radially outer diameter surface 26*b* of the disc 22 in the event of an overspeed condition. According to such embodiments, both the primary and the auxiliary fits would be active in an overspeed condition.

According to the illustrated embodiment, the auxiliary interface 28 is disposed radially outward from the primary interface 26. However, according to other embodiments, the auxiliary interface 28 may be disposed radially inwardly from the primary interface 26.

As shown in FIGS. 2 and 3, a lock nut 30 may be used to axially retain the coverplate 24 on the disc 22. The nut 30 may be threadably engaged on a threaded stub shaft portion 22*e* projecting axially from the hub 22*a* of the disc 22. The radial interface 32 of the nut 30 with the coverplate 24 is sized to ensure that the clamping action of the nut 30 on the coverplate 24 remain active in both normal operating condition and overspeed condition. According to the illustrated embodiment, the radial interface 32 radially overlap the primary interface 26. However, it is understood that the primary interface 26 and the radial interface 32 could be radially offset.

It can be appreciated that at least some embodiments allow to reduce centrifugal loading on the primary rotor part (e.g., the disc 22) while still meeting overspeed certification criteria for the overall rotor assembly, including the secondary rotor part (e.g., the coverplate 24). At least some embodiments also provide for a rotor assembly where the secondary parts do not exert a significant centrifugal load on the primary part during normal engine operation.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to “various embodiments,” “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. The use of indefinite articles, such as “a” and “an”, as used herein with reference to a particular element is intended to encompass “one or more” such elements, and similarly the use of the definite article “the” in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while the primary and secondary rotor parts have been respectively described as a turbine disc and a coverplate, it is understood that the general principals of the above described radial transitional fit could be applied to other rotor components. For instance, the secondary rotor part could be a stub shaft mounted to a disc such as a compressor disc. In addition, it is understood that the annular interface surfaces of does not have to be circumferentially continuous. Indeed, they could be interrupted and composed of circumferentially spaced-apart segments. Yet further modifications could be implemented by a person of ordinary skill in the art in view of the present disclosure, which modifications would be within the scope of the present technology.

The invention claimed is:

1. A rotor assembly for a gas turbine engine, the rotor assembly comprising:

a disc mounted for rotation about an axis, the disc having a hub, a web extending radially outward from the hub, and a blade attachment at a radially outer diameter of the web;

a coverplate mounted to a forward or an aft facing side of the disc, the coverplate having a primary disc interface and an auxiliary disc interface, the primary disc interface including a radially inner diameter surface in tight fit engagement with a corresponding radially outer diameter surface of the disc, the auxiliary disc interface including a radially outer surface engageable with a surrounding radially inner abutment surface of the disc;

wherein under non-overspeed operating conditions, the radially outer surface of the auxiliary disc interface of the coverplate is spaced by a gap radially inwardly from the surrounding radially inner abutment surface of the disc, and wherein in the event of a rotor overspeed condition, the radially outer surface of the auxiliary disc interface of the coverplate moves outward under the centrifugal force against the surrounding radially inner abutment surface of the disc.

2. The rotor assembly as defined in claim 1, wherein the gap is sized as a function of a centrifugal growth of the coverplate relative to disc in the rotor overspeed condition.

3. The rotor assembly as defined in claim 1, wherein the gap is sized to close when a centrifugal load in the rotor overspeed condition plastically deforms the coverplate.

4. The rotor assembly as defined in claim 1, wherein the auxiliary disc interface is spaced radially outward from the primary disc interface.

5. The rotor assembly as defined in claim 4, wherein the corresponding radially outer diameter surface of the disc projects axially from the hub of the disc, and wherein the surrounding radially inner abutment surface of the disc extends axially from the web.

6. The rotor assembly as defined in claim 1, wherein the tight fit engagement between the coverplate and the disc transitions from the primary disc interface to the auxiliary disc interface when a speed of the rotor assembly exceeds a maximum operation speed of the rotor assembly.

7. The rotor assembly as defined in claim 6, wherein a nut is threadably engaged with the disc to axially retain the coverplate on the disc, wherein the nut is spaced radially from the auxiliary disc interface of the coverplate, and wherein an interface between the nut and the coverplate is sized radially to preserve a clamping action of the nut on the coverplate when the tight fit engagement transitions from the primary disc interface to the auxiliary disc interface.

8. A rotor assembly for a gas turbine engine, comprising:

a disc mounted for rotation about an axis, the disc having a web extending radially outwardly from a hub to a peripheral rim carrying a circumferential array of blades;

a coverplate interfaced with the disc via a primary interface, the primary interface comprising a radially inner diameter surface of the coverplate in tight fit engagement with a radially outer diameter surface projecting axially from the hub of the disc; and a centrifugal load path operable for transferring centrifugal loads from the coverplate to the disc, the centrifugal load path having an idle state in which the centrifugal load path is disabled to hinder transfer of centrifugal loads from the coverplate to the disc when a speed of the rotor assembly is inferior to a maximum operating speed, and an active state in which the centrifugal load path is active to transfer centrifugal loads from the coverplate to the disc when the speed of the rotor assembly exceeds the maximum operating speed;

wherein the centrifugal load path comprises and a radially outer diameter surface of the coverplate and a radially inner diameter surface of the disc, the radially inner diameter surface of the disc surrounding the radially outer diameter surface of the coverplate, the radially inner diameter surface of the disc and the radially outer diameter surface of the coverplate spaced by a gap when the centrifugal load path is in the idle state.

9. The rotor assembly as defined in claim 8, wherein the gap is sized to close when a speed of the rotor assembly exceeds the maximum operating speed.

10. The rotor assembly as defined in claim 9, wherein the gap is sized as a function of a centrifugal growth rate of the coverplate.

11. The rotor assembly as defined in claim 8, wherein the gap is sized to close when the centrifugal loads plastically deforms the coverplate.

12. The rotor assembly as defined in claim 8, wherein the tight fit engagement of the primary interface is configured to become loose when the centrifugal load path is in the active state.

13. The rotor assembly as defined in claim 12, wherein a nut is threadably engaged with the disc to axially retain the coverplate on the disc, wherein the nut radially overlaps the primary interface, and wherein an interface between the nut and the coverplate is sized radially to preserve a clamping action of the nut on the coverplate when the tight fit engagement of the primary interface becomes loose.

14. A turbomachine comprising:

a primary rotor part mounted for rotation about an axis;

a secondary rotor part mounted to the primary rotor part for joint rotation therewith about the axis;

wherein the primary rotor part and the secondary rotor part have a primary interface comprising a tight fit between a radially inner diameter surface of the secondary rotor part and a radially outer diameter surface of the primary rotor part;

wherein the primary rotor part has a radial stop operable to limit centrifugal growth of the secondary rotor part when a maximum operating speed of the primary rotor part is exceeded, the radial stop including a radially inner surface facing an associated radially outer surface of the secondary rotor part; and wherein when an operating speed of the primary rotor part is inferior to the maximum operating speed, the radial stop of the primary rotor part and the associated radially outer surface of the secondary rotor part are spaced by a radial gap, the radial gap being sized to close when the maximum operating speed is exceeded.

15. The turbomachine as defined in claim 14, wherein the radial gap is sized to close in response to a centrifugal growth of the secondary rotor part relative to the primary rotor part only when the operating speed exceeds the maximum operating speed.

16. The turbomachine as defined in claim 15, wherein the primary rotor part is a turbine disc, and wherein the secondary rotor part is a coverplate.

17. The turbomachine as defined in claim 16, wherein the turbine disc has a web extending radially outwardly from a hub to a peripheral rim, the radial stop provided at a radially outer end of the hub, the radially outer diameter surface of the primary rotor part provided at the hub of the turbine disc.

18. The turbomachine as defined in claim 16, wherein the radial stop is disposed radially outward from the primary interface.

19. The turbomachine as defined in claim 15, wherein the tight fit at the primary mounting interface is configured to become loose above the maximum operating speed.

* * * * *